(12) United States Patent
Shibuya et al.

(10) Patent No.: US 11,340,243 B2
(45) Date of Patent: May 24, 2022

(54) AUTOMATED ANALYSIS SYSTEM

(71) Applicant: HITACHI HIGH-TECHNOLOGIES CORPORATION, Tokyo (JP)

(72) Inventors: Satoshi Shibuya, Tokyo (JP); Toshihide Hanawa, Tokyo (JP); Mikio Kasama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 150 days.

(21) Appl. No.: 16/492,624

(22) PCT Filed: Feb. 27, 2018

(86) PCT No.: PCT/JP2018/007116
§ 371 (c)(1),
(2) Date: Sep. 10, 2019

(87) PCT Pub. No.: WO2018/168432
PCT Pub. Date: Sep. 20, 2018

(65) Prior Publication Data
US 2020/0049724 A1 Feb. 13, 2020

(30) Foreign Application Priority Data
Mar. 14, 2017 (JP) .............................. JP2017-048265

(51) Int. Cl.
*G01N 35/00* (2006.01)
*G01N 35/10* (2006.01)
(Continued)

(52) U.S. Cl.
CPC ... *G01N 35/00722* (2013.01); *G01N 35/1009* (2013.01); *G06F 3/0482* (2013.01);
(Continued)

(58) Field of Classification Search
CPC .............................................. G01N 35/00722
See application file for complete search history.

(56) References Cited

U.S. PATENT DOCUMENTS 9,074,971 B2 7/2015 Ariyoshi
2010/0104478 A1* 4/2010 Kondou ........... G01N 35/00732
422/400

(Continued)

FOREIGN PATENT DOCUMENTS

JP 2003-004750 A 1/2003
JP 2005-045370 A 2/2005
(Continued)

OTHER PUBLICATIONS

Introduction of New Product LAbOSPECT mobile, Information magazine of Hitachi automatic analysis Lab Scope, 2016 Autumn vol. 53, pp. 8-9.
(Continued)

Primary Examiner — Roland J Casillas
(74) Attorney, Agent, or Firm — Mattingly & Malur, PC

(57) ABSTRACT

Reducing screen shift operations performed in confirming a device status of an automated analysis device efficiently enhances inspection work. A tablet terminal is used to obtain device information indicating the device status of an automated analysis device and to create and display a status confirmation screen indicating the device status based on the obtained device information. The status confirmation screen has a first display area showing each device button corresponding to each of the automated analysis devices coupled to the tablet terminal and a second display area showing the device status of the automated analysis devices corresponding to the selected device button. Based on the device information of the automated analysis device corresponding to the selected device button, the information management unit creates a status screen indicating the device status in the automated analysis device and controls the display to show the status screen.

8 Claims, 14 Drawing Sheets

(51) Int. Cl.
*G06F 3/0482* (2013.01)
*G06F 3/04845* (2022.01)
*G06F 9/54* (2006.01)

(52) U.S. Cl.
CPC .......... *G06F 3/04845* (2013.01); *G06F 9/542* (2013.01); *G01N 2035/009* (2013.01); *G01N 2035/0091* (2013.01); *G01N 2035/1025* (2013.01)

(56) References Cited

U.S. PATENT DOCUMENTS

| | | | |
|---|---|---|---|
| 2010/0211886 A1* | 8/2010 | Forstall | G06F 3/04886 715/745 |
| 2010/0223556 A1 | 9/2010 | Wakabayashi et al. | |
| 2012/0109529 A1* | 5/2012 | Ariyoshi | G01N 35/026 702/19 |
| 2016/0109473 A1* | 4/2016 | DeMarco | G01N 30/88 700/97 |

FOREIGN PATENT DOCUMENTS

| | | |
|---|---|---|
| JP | 2010-101851 A | 5/2010 |
| JP | 2012-093326 A | 5/2012 |
| JP | 2015-049063 A | 3/2015 |
| JP | 2016-066258 A | 4/2016 |
| WO | 2007/086140 A1 | 8/2007 |

OTHER PUBLICATIONS

International Search Report of PCT/JP2018/007116 dated Apr. 24, 2018.

* cited by examiner

FIG. 8
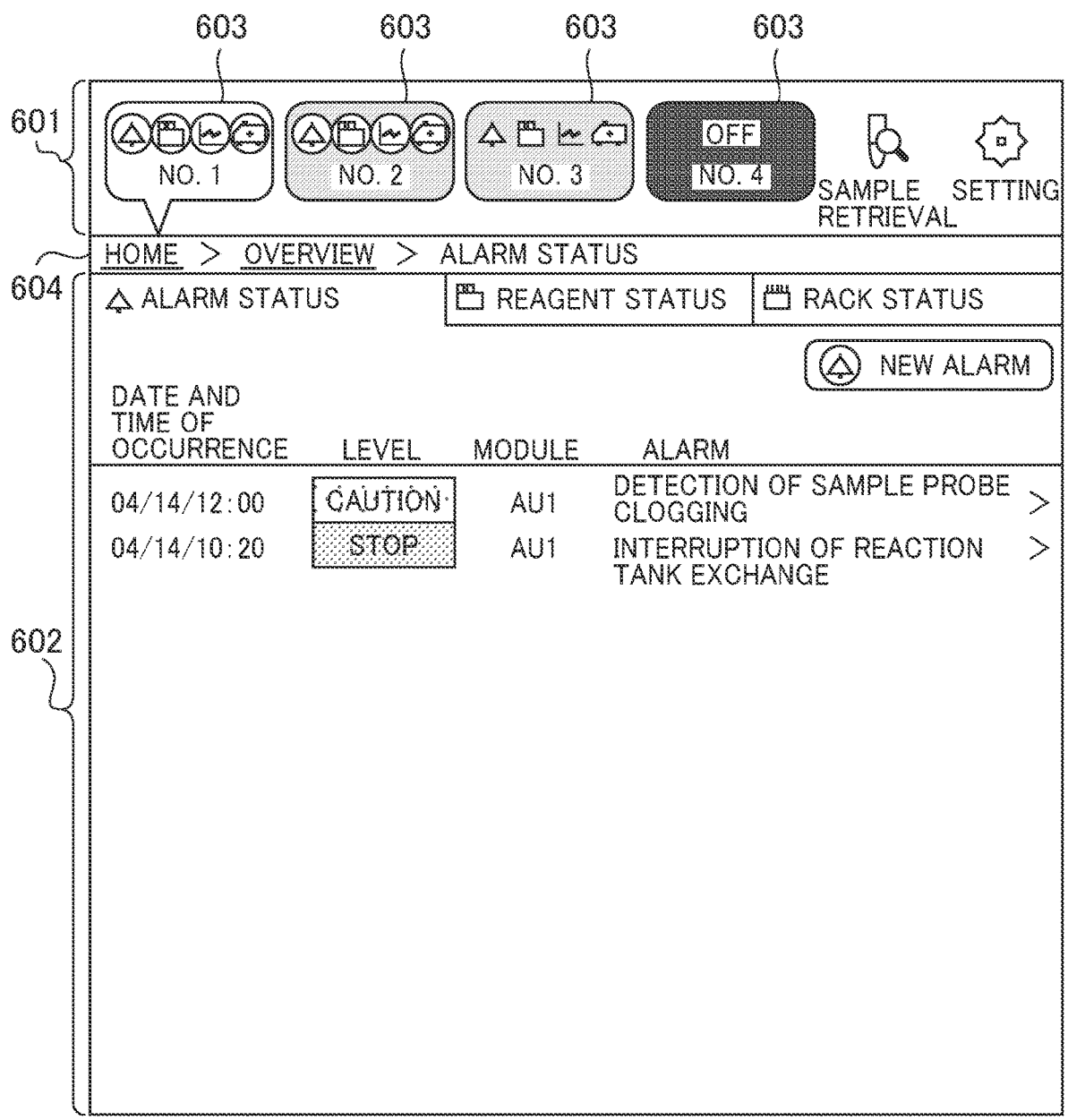
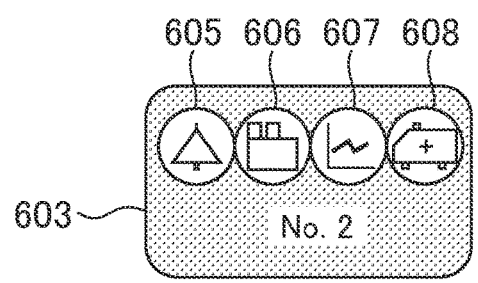

AUTOMATED ANALYSIS SYSTEM

TECHNICAL FIELD

The invention relates to an automated analysis system and more particularly to a technique effective in confirming the status of a plurality of automated analysis devices.

BACKGROUND ART

As the remote monitoring technology of the automated analysis device, there is a technique of coupling an automated analysis device for performing a quantitative and qualitative analysis of a specific component contained in a sample by using a biological sample such as blood or urine (hereinafter, simply referred to as sample) and a reagent, in a wireless network and remotely monitoring the status of the automated analysis device in a tablet terminal.

The tablet terminal has a small screen size, considering the portability, and a user operates the tablet terminal generally by tapping the screen; therefore, the information amount displayed on one screen is limited compared to a desktop PC (personal computer).

Therefore, when monitoring a plurality of automated analysis devices in the tablet terminal, one automated analysis device to be referred to is selected from a list of the coupled automated analysis devices and the screen is designed to show the further detailed information by hierarchizing the screen into the status screen of alarm status, reagent status, or measurement results of the selected automated analysis device and further detailed screen.

As the technique of this type for remotely monitoring a plurality of automated analysis devices, for example, Patent Literature 1 is well known. In the Patent Literature 1, a plurality of sample processing units are provided, an object for displaying an operation screen of the corresponding sample processing unit is displayed in each of a plurality of operation units, and when accepting an operation of selecting the object provided in each of the operation units through each input unit, an operation screen for operating the sample processing unit corresponding to the operation unit is displayed in a display unit in a way of overlapping with a part of the common area.

CITATION LIST

Patent Literature

Patent Literature 1: Japanese Unexamined Patent Application Laid-Open No. 2012-93326

SUMMARY OF INVENTION

Technical Problem

As mentioned above, the structure of the hierarchical screen for showing the further detailed information has a disadvantage as deepening the hierarchical screen and making the operation troublesome. For example, when displaying the status of a plurality of automated analysis devices, at first one automated analysis device a user wants to see is selected and further the classified detailed information within the automated analysis device is sequentially displayed in screen.

Specifically, for example, while a user is working looking at the status screen of one automated analysis device in a tablet terminal, if an alarm occurs in another automated analysis device, the user has to select the alarm occurring automated analysis device from the screen of the currently watching automated analysis device and shift to the alarm screen.

Furthermore, when determining whether some countermeasures are required or not according to the contents of the alarm, the user has to keep shifting the screen up to the screen showing the detailed information of the alarm. When it is found in the detailed screen of the alarm that the alarm does not require any countermeasures, the user has to return to the original screen of the automated analysis device before the alarm confirmation, in order to continue the current work, which is a troublesome work and deteriorates the work efficiency.

An object of the invention is to provide a technique capable of advancing the inspection work efficiently by reducing the screen shifting operation in confirming the device status of the automated analysis device.

The above and other objects and novel features of the invention will be apparent from this description and the accompanying drawings.

Means for Solving the Problems

The typical one of the inventions disclosed in this application will be briefly described as follows.

Specifically, a typical automated analysis system includes one and more automated analysis devices for measuring a sample, and a terminal device coupled to the automated analysis device. The terminal device includes an information management unit and a display unit.

The information management unit obtains device information indicating the device status of the automated analysis device output from the same device and creates a status confirmation screen indicating the device status of the automated analysis device, based on the obtained device information. The display unit displays the status confirmation screen created by the information management unit.

The status confirmation screen displayed by the display unit has a first display area and a second display area. The first display area shows each device button corresponding to each automated analysis device coupled to the terminal device. The second display area shows the device status of the automated analysis device corresponding to the selected device button.

When the device button is selected, the information management unit creates a status screen indicating the device status of the automated analysis device, based on the device information of the automated analysis device corresponding to the selected device button and displays the above in the display unit.

Particularly, when the automated analysis device notifies an alert, the information management unit controls the display unit to change a display of the device button corresponding to the automated analysis device, based on the device information of the automated analysis device.

Advantage of the Invention

The effects obtained by the typical embodiment of the invention disclosed in this application will be briefly described as follows.

(1) It is possible to reduce the number of the steps in confirming the status of the automated analysis device.

(2) According to the above (1), it is possible to improve the inspection efficiency.

DESCRIPTION OF THE DRAWINGS

FIG. 8 is an explanatory view showing one example of the main screen displayed in the tablet terminal when selecting an automated analysis device on the home screen of FIG. 6.

DESCRIPTION OF EMBODIMENTS

Figure 1:
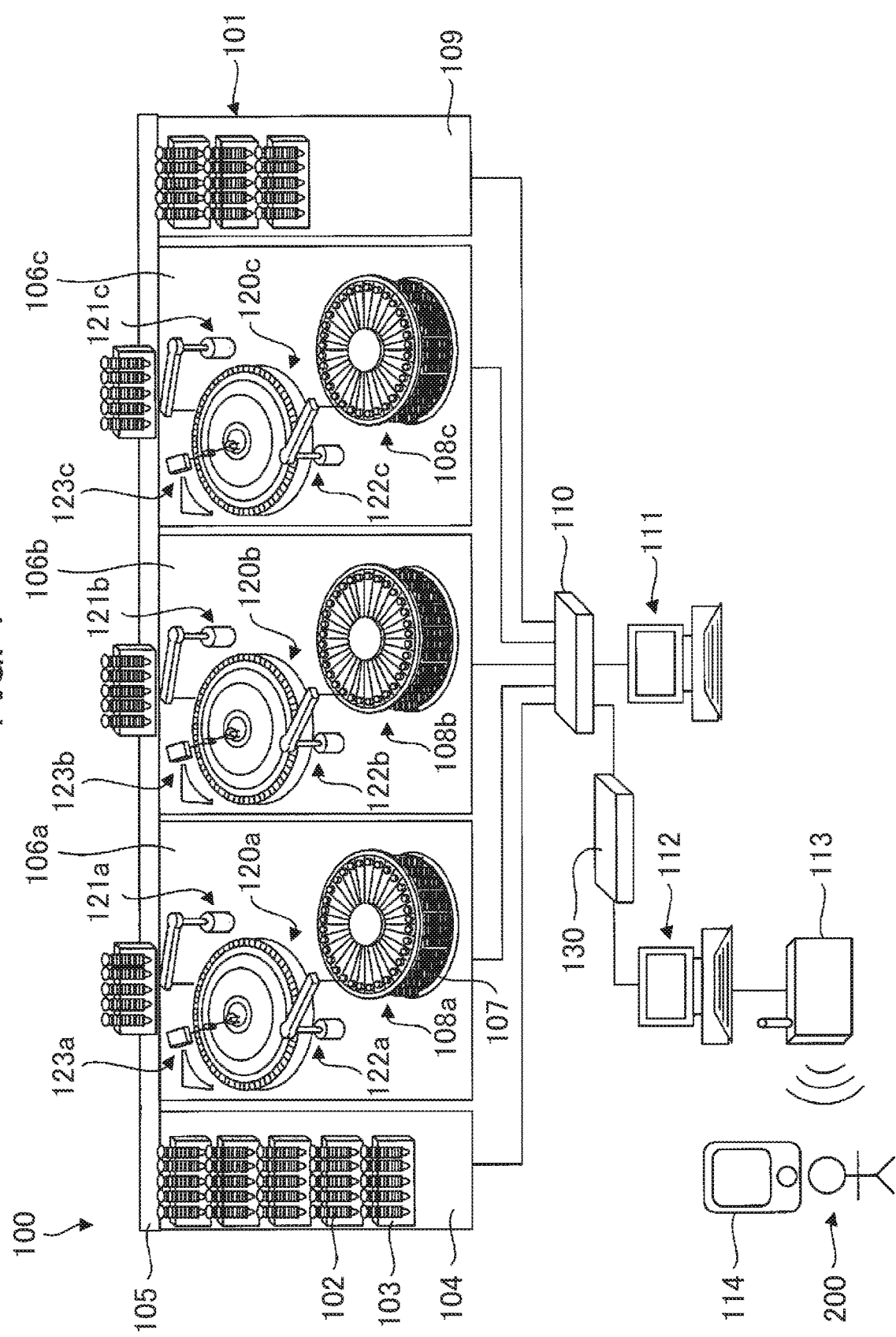
FIG. 1 is an explanatory view showing one example of the structure of an automated analysis system according to one embodiment.

In all the drawings for describing the embodiments, the same reference numerals are attached to the same members and the repetitive description thereof will be omitted.

Hereinafter, the embodiments will be described in detail.
<Structure Example 1 of Automated Analysis System>

FIG. 1 is an explanatory view showing one example of the structure of an automated analysis system according to one embodiment.

The automated analysis system shown in FIG. 1 is to substantially show the whole structure including one automated analysis device.

As shown in FIG. 1, the automated analysis system 100 includes an automated analysis device 101, communication equipment 110, an operation unit PC 111, an information management PC 112, wireless equipment 113, and communication equipment 130.

The automated analysis device 101 includes a sample input unit 104, analysis units 106a, 106b, and 106c, a carrying line 105, a sample accommodating unit 109, and the like. This automated analysis device 101 is coupled to the operation unit PC 111 and a tablet terminal 114, for example, by a network connection.

The sample input unit 104 and the sample accommodating unit 109 are coupled by the carrying line 105 for carrying a sample rack 103. The sample input unit 104 receives the sample rack 103. The sample rack 103 mounts a plurality of sample containers 102 each having a sample to be analyzed. The sample accommodating unit 109 accommodates the sample racks 103.

The analysis units 106a, 106b, and 106c are arranged along the carrying line 105. In FIG. 1, an example of arranging three analysis units 106a, 106b, and 106c is shown; however, the number of the analysis units is not restricted as far as it is more than one.

The operation unit PC 111 is to control the whole operation of the automated analysis device 101 and is coupled to the automated analysis device 101 through the communication equipment 110 such as a hub and the like. Further, the information management PC 112, for example, a personal computer or the like is coupled to the communication equipment 110. The wireless equipment 113 such as a wireless router is coupled to the information management PC 112 and the above PC can communicate with the tablet terminal 114 in a wireless communication by the wireless equipment 113.

The sample input unit 104 receives the sample rack 103 with a plurality of sample containers 102 each having a sample to be analyzed and the sample rack is carried to the respective analysis units 106a, 106b, and 106c and the sample accommodating unit 109 through the carrying line 105.

The sample to be accommodated in the sample container 102 includes a calibration sample used for calibration measurement, an accuracy control sample used for accuracy control measurement, or a patient sample as a biological sample such as blood or urine.

Each sample container 102 mounted on the sample rack 103 is provided with a tag, not illustrated, for identifying the accommodating sample. This tag is, for example, bar code or Radio Frequency IDentification (RFID), and the identification information is read by a reading device not illustrated and transferred to the operation unit PC 111 and the like.

The analysis unit 106a includes a reaction disk 120a, a sample dispensing mechanism 121a, a reagent disk 108a, a reagent dispersing mechanism 122a, a photometric mechanism 123a, and the like. The reaction disk 120a includes a plurality of reaction containers.

The sample dispensing mechanism 121a disperses the sample housed in the sample container 102 carried through the carrying line 105 into the reaction container. The reagent disk 108a has a plurality of reagent containers 107 each containing reagent used for analysis of a sample.

The reagent dispersing mechanism 122a sucks the reagent of the reagent container 107 set in the reagent disk and disperses the above into the reaction container. The photometric mechanism 123a measures the absorbance and the scattered light intensity of the mixed liquid of the sample and the reagent contained in the reaction container.

The analysis unit 106a analyzes the optical information obtained from the photometric mechanism 123a, hence to be able to analyze the concentration of a predetermined substance in a sample. The analysis units 106b and 106c have the same structure as that of the analysis unit 106a, respectively including the reaction disks 120b and 120c, the sample dispensing mechanisms 121b and 121c, the reagent disks 108b and 108c, the reagent dispersing mechanisms 122b and 122c, and the photometric mechanisms 123b and 123c.

The tablet terminal 114 as a terminal device is communicably coupled to the information management PC 112 through the wireless equipment 113, to obtain the device information from the operation unit PC 111 through the information management PC 112, according to an instruction from the above tablet terminal 114. According to this, an operator 200 can see the information of the automated analysis device 101 in the screen of the tablet terminal 114.

<Structure Example 2 of Automated Analysis System>

Figure 2:
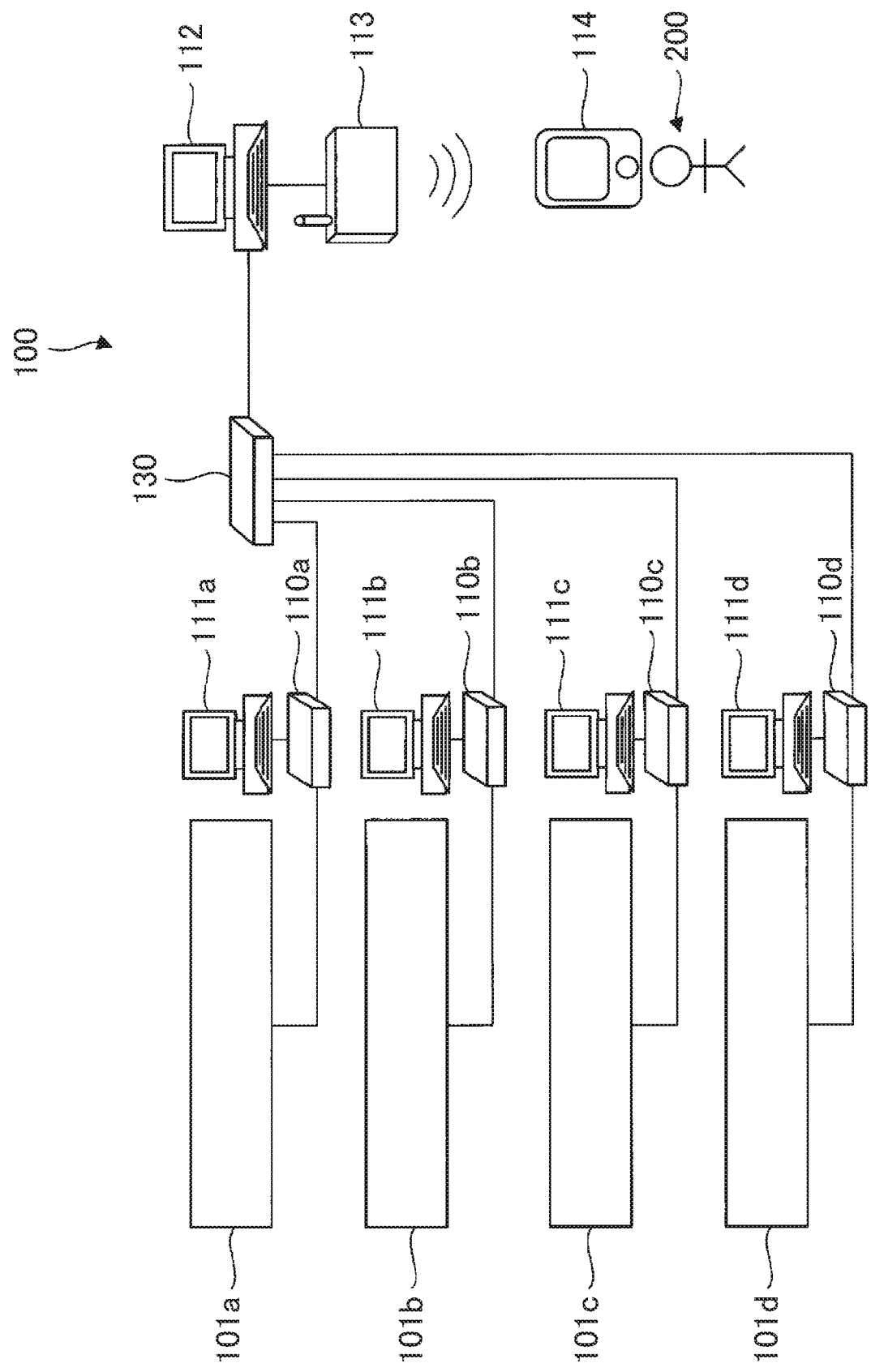
FIG. 2 is an explanatory view showing one example of the structure of an automated analysis system including a plurality of the automated analysis devices of FIG. 1.

FIG. 2 is an explanatory view showing one example of the structure of the automated analysis system having a plurality of the automated analysis devices of FIG. 1.

FIG. 2 shows an example of the structure with four automated analysis devices 101a to 101d respectively having the operation units PC 111 coupled. Here, the number of the coupled automated analysis devices is not restrictive.

The communication equipment 110a to 110d made of hub is respectively coupled to the automated analysis devices 101a to 101d. The communication equipment 110a to 110d is coupled to the communication equipment 130.

Accordingly, the automated analysis devices 101a to 101d are coupled to the information management PC 112 through the communication equipment 110a to 110d and the communication equipment 130. The information management PC 112 is communicably coupled to the tablet terminal 114 in a wireless communication with the coupled wireless equipment 113.

<Functional Structure Example>

Figure 3:
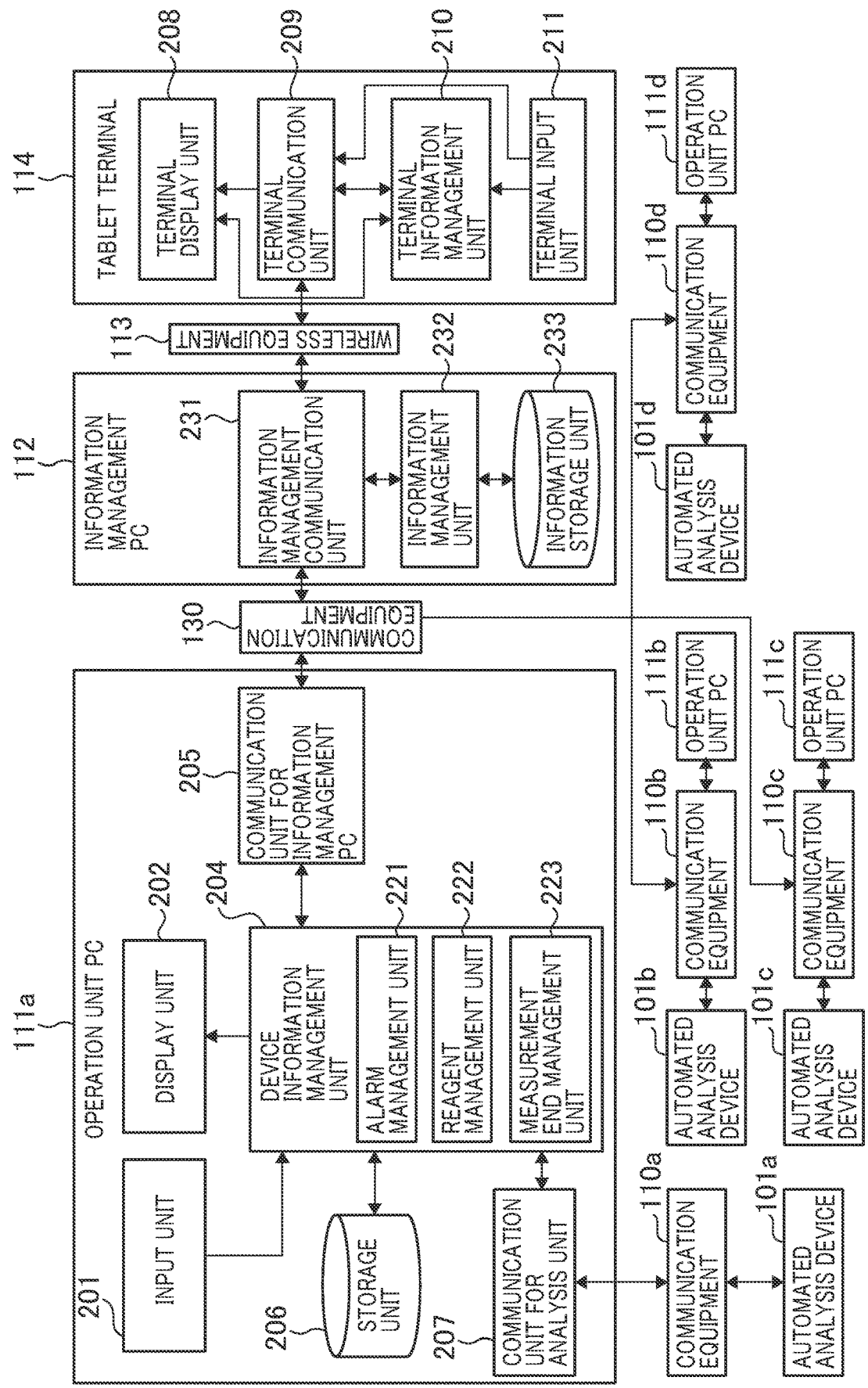
FIG. 3 is a block diagram showing one example of the functional structure of an operation unit PC, an information management PC, and a tablet terminal included in the automated analysis system of FIG. 2.

FIG. 3 is a block diagram showing one example of the functional structure of the operation unit PC, the information management PC, and the tablet terminal included in the automated analysis system of FIG. 2.

In FIG. 3, the connection structure in the automated analysis system 100 is similar to that in FIG. 2, and the operation units PC 111a, 111b, 111c, and 111d are respectively coupled to the information management PC 112 through the communication equipment 110a, 110b, 110c, and 110d and the communication equipment 130. The information management PC 112 gives and receives the information in a wireless communication through the wireless equipment 113.

The operation units PC 111b to 111d have the same functional structure as that of the operation unit PC 111a and therefore, their illustration is omitted in FIG. 3.

The operation unit PC 111a includes an input unit 201, a display unit 202, a device information management unit 204, a communication unit for information management PC 205, a storage unit 206, and a communication unit for analysis unit 207, as illustrated.

The operation unit PC 111a communicates with, for example, the analysis units 106a, 106b, and 106c and the sample accommodating unit 109 of FIG. 1 to control the operation of the whole automated analysis device 101a. The operation unit PC 111a includes the input unit 201, the display unit 202, the device information management unit 204, the communication unit for information management PC 205, the storage unit 206, and the communication unit for analysis unit 207.

The input unit 201 is, for example, a keyboard or a mouse, pushing down the button display on various operation screens displayed in the display unit 202 by a mouse cursor; for example, the input unit performs clicking of a mouse and input of numeric or character into an input frame from the keyboard. In other words, the input unit 201 and the display unit 202 are formed by Graphical User Interface (GUI).

The device information management unit 204 includes an alarm management unit 221, a reagent management unit 222, and a measurement end management unit 223.

The reagent management unit 222 manages the information about the reagents of the reagent containers 107 set in the reagent disks 108a, 108b, and 108c of FIG. 1. Specifically, the above unit performs linking of analysis items, management of remaining amount, management of use priority order when several reagent containers 107 are set for one analysis item, and management of the reagent expiration date.

When a new reagent container 107 is set, the reagent management unit 222 determines whether the same reagent container has been set in the past, retrieving the accumulated reagent information stored in the storage unit 206. When the above has been set, the unit 222 takes out the reagent information stored in the storage unit 206; while when it has not been set, the unit 222 manages the above as the new reagent container 107.

As for the remaining amount management, the unit 222 registers a reagent whose remaining amount falls below the threshold of every analysis item set through the input unit 201, into a reagent preparation list or a reagent disposal list. Further, the reagent management unit 222 controls the display of the display unit 202.

The alarm management unit 221 informs the display unit 202 of abnormality detected based on a predetermined criterion such as abnormality detection theory, according to the information and the device state from a detection unit, not illustrated, provided in the automated analysis device 101a and stores the above abnormality information into a temporary storage unit, not illustrated, to notify the tablet terminal 114 of the abnormality.

The measurement end management unit 223 monitors whether the measurement results of the calibration sample, the accuracy control sample, or the patent sample measured by the automated analysis device 101a are output or not. When the measurement results are output from the automated analysis device 101a, the unit 223 stores the measurement end information of the sample information in the storage unit 206 to notify the tablet terminal 114 of the above effect.

The communication unit for information management PC 205 receives a request text from the information management PC 112 and transmits the necessary information such as the information managed by the device information management unit 204 to the information management PC 112.

The information management PC 112 includes an information management communication unit 231, an information management unit 232, and an information management storage unit 233.

The information management communication unit 231 controls the wireless communication with the tablet terminal 114, creates a communication text to be transmitted to the tablet terminal 114, distributes the information of the communication text received from the tablet terminal 114, and transmits the information to the operation unit PC 111a.

The information management unit 232 stores the identification information of the coupled automated analysis devices 101a to 101d such as IP address into the information management storage unit 233. According to the contents instructed from the tablet terminal 114, the information management unit 232 makes a communication to obtain the device information of the corresponding automated analysis device through the information management communication unit 231.

The communication unit for analysis unit 207 controls the communication with the automated analysis device 101a, creates a communication text to be transmitted to the automated analysis device 101a, and distributes the information of the communication text received from the automated analysis device 101a.

The tablet terminal 114 includes a terminal display unit 208, a terminal communication unit 209, a terminal information management unit 210, and a terminal input unit 211. The tablet terminal 114 communicates with the operation unit PC 111a (to 111d) via the information management PC 112 through the wireless equipment 113. According to this, the terminal obtains various types of information from the automated analysis device 101a (to 101d) and operates the automated analysis device 101a (to 101d).

In the tablet terminal 114, the terminal display unit 208 as a display unit and the terminal input unit 211 form GUI, similarly to the operation unit PC 111a. According to this, the terminal receives various types of information including the reagent information, the alarm information, and the notification information transmitted from the operation unit PC 111a (to 111d) and displays the above in the terminal display unit 208. Further, the terminal enters an operation instruction into the automated analysis device 101a (to 101d) through the terminal input unit 211 and transmits the above to the operation unit PC 111a.

The terminal communication unit 209 controls the wireless communication with the information management PC 112, creates a communication text to be transmitted to the information management PC 112, and distributes the information of the communication text received from the information management PC 112.

The terminal information management unit 210 as an information management unit manages the information including the alarm information and the reagent information about the automated analysis device received from the operation unit PC 111a (to 111d) through the information management PC 112 and performs the operation processing on the screen from the terminal input unit 211.

<Example of Screen Display in Tablet Terminal>

Figure 4:
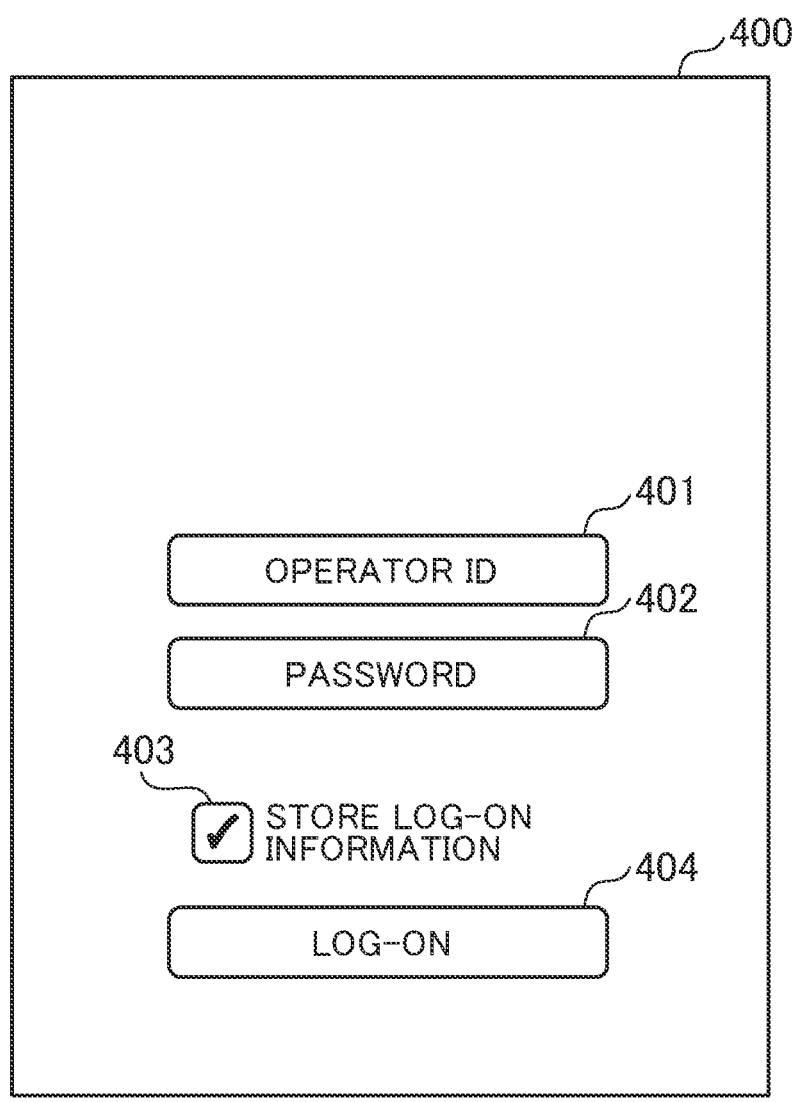
FIG. 4 is an explanatory view showing one example of the screen display of the tablet terminal included in the automated analysis system of FIG. 3.

FIG. 4 is an explanatory view showing one example of the screen display in the tablet terminal included in the automated analysis system of FIG. 3.

FIG. 4 is to show one example of the log-on screen displayed when activating the tablet terminal 114.

On the log-on screen 400, an input box 401 is shown and an input box 402 is shown below the above input box 401. The input box 401 is a box to enter an operator ID. The operator ID is a unique number or character and given to every operator. The input box 402 is a box to enter a password.

Further, a check box 403 is shown below the input box 402 and a log-on button 404 is shown below the above check box 403. The check box 403 is used when an operator wants to record the log-on information, specifically the operator ID and the password input in the input boxes 401 and 402. According to this, from this time on, the operator ID and the password are still being inputted in the input boxes 401 and 402.

On this log-on screen 400, the operator ID and the password are respectively input into the input boxes 401 and 402 and the log-on button 404 is pushed down, hence to do the authentication of the operator ID and the password.

The respective storage units 206 included in the operation units PC 111a to 111d of the automated analysis devices 101a to 101d of FIG. 3 store the operator IDs and the passwords. The operator ID and the password input from the tablet terminal 114 are collated with the operator IDs and the passwords stored in the storage unit 206 of each of the operation units PC 111a to 111d to perform the log-on processing.

Continuously, the log-on processing for collating the operator ID and the password will be described.

<Example of Log-On Processing>

Figure 5:
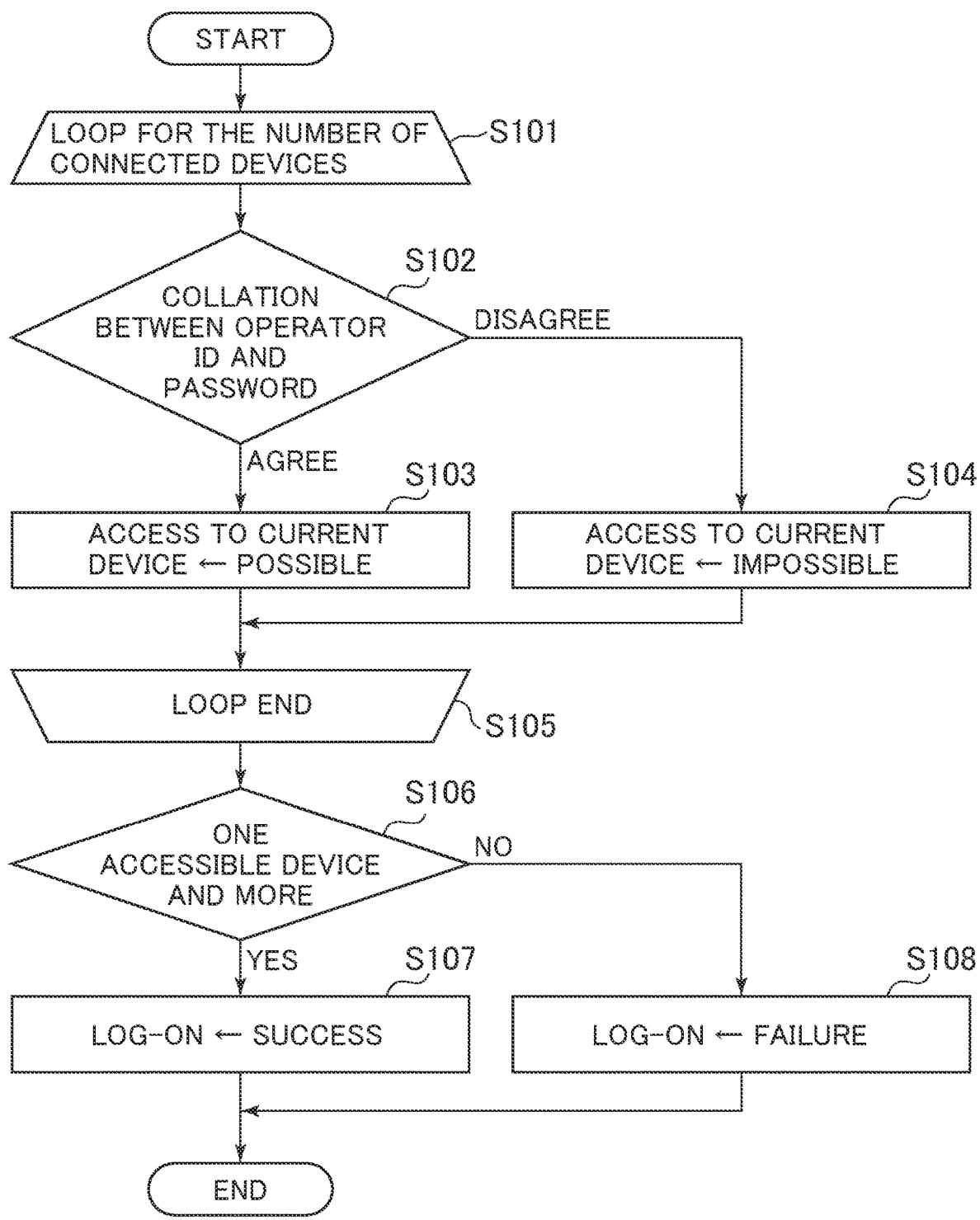
FIG. 5 is a flow chart showing one example of log-on processing in the automated analysis system of FIG. 3.

FIG. 5 is a flow chart showing one example of the log-on processing by the automated analysis system of FIG. 3.

Network connection status of the respective automated analysis devices 101a to 101d is stored in the information management storage unit 233 of the information management PC 112 and the processing for the number of the automated analysis devices coupled by the network will be repeated referring to the information stored in the above information management storage unit 233 (S101 to S105).

At first, the information management unit 232 of the information management PC 112 collates the operator IDs and the passwords stored in the storage unit 206 of the operation unit PC 111a with the operator ID and the password input from the tablet terminal 114 (Step S102).

When a match is found, an access to the automated analysis device 101a is determined to be possible (Step S103). When there is no match, the access to the automated analysis device 101a is determined to be impossible (Step S104). Further, the information of the automated analysis device 101a determined inaccessible cannot be referred to.

After repeating the processing of Steps S102 to S104, the processing for all the coupled automated analysis devices 101a to 101d is completed.

Then, when there is one or more accessible automated analysis device (Step S106), the log-on becomes successful (Step S107); when there is no accessible automated analysis device, the log-on fails (Step S108) and the screen does not shift to the main screen.

<Display Example of Home Screen>

Figure 6:
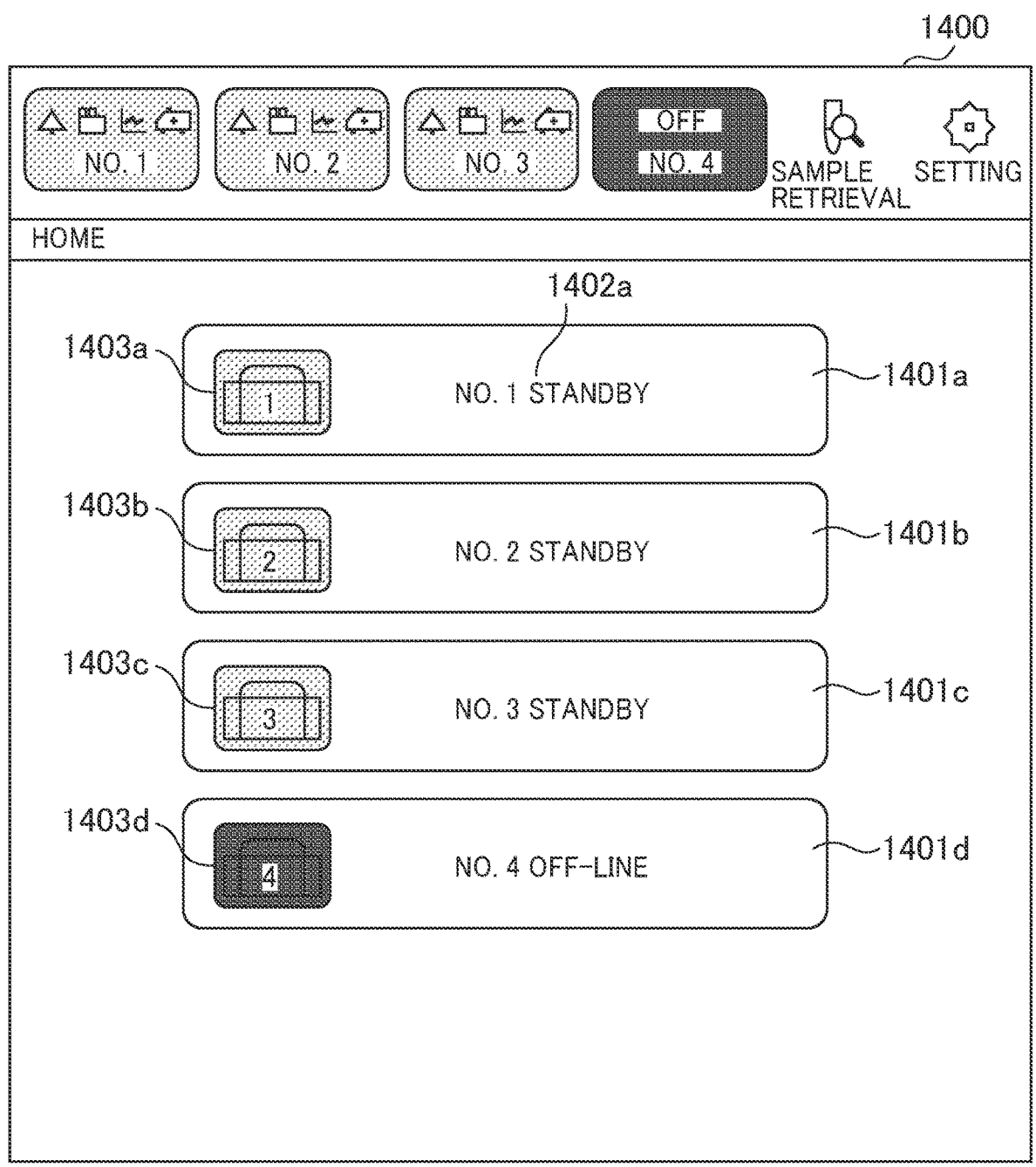
FIG. 6 is an explanatory view showing one example of a home screen displayed on a main screen after success of log-on, in the tablet terminal included in the automated analysis system of FIG. 3.

FIG. 6 is an explanatory view showing one example of the home screen displayed on the main screen after success of the log-on displayed in the table terminal included in the automated analysis system of FIG. 3.

The home screen shown in FIG. 6 is created mainly by the terminal information management unit 210 based on the processing results of the log-on processing of FIG. 5 received from the information management unit 232.

On the home screen 1400, a device select button 1401a, a device select button 1401b, a device select button 1401c, and a device select button 1401d are shown from top to bottom.

These device select buttons 1401a to 1401d respectively correspond to the automated analysis devices accessible by the tablet terminal 114, as a button for selecting some automated analysis device.

In the example shown in FIG. 6, the device select button 1401a, the device select button 1401b, the device select button 1401c, and the device select button 1401d are displayed as mentioned above. In other words, it means that there are four automated analysis devices that the tablet terminal 114 can gain access to for displaying the information.

The device select button 1401a shows a device name 1402a and a device status icon 1403a. Also the device select buttons 1401b to 1410d respectively show the device names 1402b to 1402d and the device status icons 1403a to 1403d.

The device name 1402*a* is a name given to each automated analysis device, so that the operator can recognize which device select button corresponds to which automated analysis device. The device status icon 1403*a* shows the device status of the automated analysis device such as analyzing or waiting state as distinguished in icon color.

Further, in the log-on processing of FIG. 5, the automated analysis device which has failed in log-on is displayed as distinguished from the device which has succeeded in log-on and at the same time, the above device is controlled to be impossible for the operator to push its device select button.

FIG. 6 shows that the device icon 1403*d*, specifically the automated analysis device having the device name "No. 4" is in an off-line state, in a color different from the color of the other device icons 1403*a* to 1403*c*. The device icon 1403*d* whose automated analysis device is in the off-line state is controlled not to be pushed.

By pushing the device select button which is not in the off-line state, for example, the device select button 1401*a*, the main base screen of the automated analysis device "No. 1" is displayed. When gaining access to the automated analysis device having the device name "No. 2", the device select button 1401*b* is pushed.

<Example of Hierarchical Screen>

Figure 7:
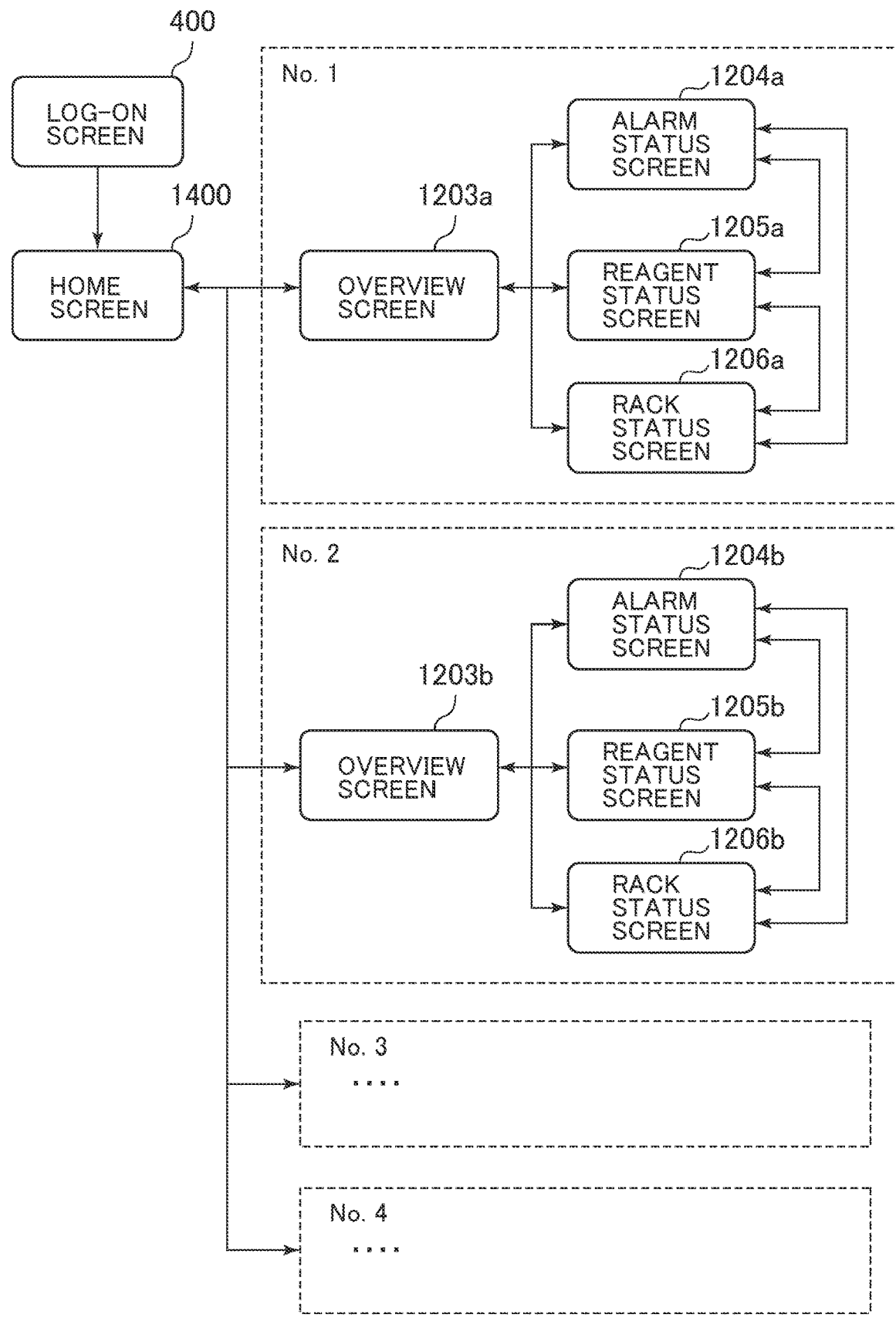
FIG. 7 is an explanatory view showing one example of a hierarchical screen including the log-on screen and the home screen displayed in the tablet terminal included in the automated analysis system of FIG. 3.

FIG. 7 is an explanatory view showing one example of a hierarchical screen including the log-on screen and the home screen displayed in the tablet terminal included in the automated analysis system of FIG. 3.

Also the hierarchical screen shown in FIG. 7 is mainly created by the terminal information management unit 210 of the tablet terminal 114.

At first, in the success in log-on on the log-on screen 400, the home screen 1400 is displayed. In the home screen 1400, for example, when the device select button 1401*a* of FIG. 6, specifically the device select button corresponding to the automated analysis device having the device name "No. 1" is pushed, an overview screen 1203*a* of the automated analysis device having the device name "No. 1" is displayed. The overview screen is a screen showing the device status of the whole automated analysis device having the device name "No. 1".

The overview screen 1203*a* includes an alarm status screen 1204*a*, a reagent status screen 1205*a*, and a rack status screen 1206*a* as the status screens categorized in its lower layer. The overview screen 1203*a*, the alarm status screen 1204*a*, the reagent status screen 1205*a*, and the rack status screen 1206*a* are the status screens.

The alarm status screen 1204*a* is a screen indicating the occurrence status of an alarm in the automated analysis device. The reagent status screen 1205*a* is a screen indicating the remaining amount of reagent. The rack status screen 1206*a* is a screen indicating the measurement status of the sample rack 103 accommodated in the sample accommodating unit 109 of FIG. 1 and the sample on the sample rack 103.

The alarm status screen 1204*a*, the reagent status screen 1205*a*, and the rack status screen 1206*a* are the status screens in the automated analysis device having the device name "No. 1 because the device status button 1403*a* is pushed as mentioned above.

The alarm status screen 1204*a*, the reagent status screen 1205*a*, and the rack status screen 1206*a* can be mutually shifted to each other. Although it is not illustrated, the alarm status screen 1204*a*, the reagent status screen 1205*a*, and the rack status screen 1206*a* respectively have an alarm detailed screen, a reagent detailed screen, and a rack detailed screen further indicating the detailed information, in their lower layers.

The hierarchized screen displayed in the tablet terminal 114 has the same hierarchical screen for the coupled automated analysis devices "No. 1" to "No. 4", as illustrated in FIG. 7, to show the status of the respective automated analysis devices on the respective screens.

The above-mentioned hierarchy of the screen is the same as in the automated analysis devices having the device names "No. 2", "No. 3", and "No. 4". For example, in the case of the overview screen 1203*b* corresponding to "No. 2", it has the alarm status screen 1204*b*, the reagent status screen 1205*b*, and the rack status screen 1206*b* as the status screens categorized in its lower layer.

<Display Example of Main Screen>

FIG. 8 is an explanatory view showing one example of the main screen displayed in the table terminal when an automated analysis device is selected on the home screen of FIG. 6.

The main screen is formed by a first display area 601, a hierarchical list 604, and a second display area 602, as illustrated in FIG. 8(*a*). Below the first display area 601, the hierarchical list 604 is displayed and below the hierarchical list 604, the second display area 602 as a status screen is displayed. The first display area 601 and the second display area 602 form a status confirmation screen.

The device button 603 is arranged in the first display area 601. This device button 603 is a button corresponding to each of the coupled automated analysis devices. FIG. 8(*a*) shows four device buttons 603, indicating that four automated analysis devices are coupled.

The second display area 602 is an area of the base screen for showing the device information, in short, the alarm status and the reagent status of the selected one of the coupled automated analysis devices. FIG. 8(*a*) shows the example of displaying the alarm status screen corresponding to the base screen of the automated analysis device having the device name "No. 1".

The hierarchical list 604 is a list for displaying the hierarchical structure of the base screen, indicating the currently-displayed base screen belongs to which hierarchical screen. FIG. 6 shows that the "home" in the left end of the hierarchical list 604 indicates the upmost screen of the hierarchy and the "alarm status" in the right end indicates the current displaying screen. Further, when the underlined display of the hierarchical list 604 is selected, the base screen is shifted to the selected screen and the selected screen is displayed.

Here, various types of icons displayed in the device button 603 in the first display area 601 will be described.

As illustrated in FIG. 8(*a*), an alarm notification icon 605, a sample-remaining amount shortage notification icon 606, a measurement end notification icon 607 of calibration/accuracy control sample, and a measurement end notification icon 608 of urgent patient sample are shown within the device button 603. These icons are alert icons.

The first alarm notification icon 605 is an icon for notifying the alarm notification information. The second sample-remaining amount notification icon 606 is an icon for notifying the reagent remaining amount shortage.

The third measurement end notification icon 607 of calibration/accuracy control sample is an icon for notifying the measurement end of the calibration and accuracy control sample. The fourth measurement end notification icon 608 of urgent patient is an icon for notifying the measurement end of an urgent patient sample.

As for the alarm notification information, an alarm notification occurring in an automated analysis device is transmitted from the alarm management unit 221 to the tablet terminal 114 through the information management PC 112.

When the tablet terminal 114 receives an alarm notification, the terminal information management unit 210 flickers the alarm notification icon 605 displayed in the device button 603 corresponding to the relevant automated analysis device.

Further, the occurring alarm is classified into level depending on the importance and the icon is flickered in various colors depending on the levels. For example, the icon is classified into colors of two levels such as the importance of "caution" and "stop" and is flickered.

When the alarm of the "caution" level and the alarm of the "stop" co-occur, the terminal information management unit 210 displays the icon of the level having a higher priority, for example, as "caution"<"stop".

As for the reagent-remaining amount notification, the remaining amount information of the reagent mounted in the automated analysis device 101 is obtained from the storage unit 206 and the reagent management unit 222 periodically transmits the result of checking the reagent shortage to the tablet terminal 114 as the reagent remaining amount notification.

When the tablet terminal 114 receives the reagent remaining amount notification, the terminal information management unit 210 flickers the reagent shortage notification icon 606 within the device button 603 of the automated analysis device. Alternatively, the reagent remaining amount level occurring is classified and the icon is displayed and flickered in different color depending on each level.

For example, the reagent remaining amount level is classified by the threshold value of three steps and icon is displayed and flickered depending on the following three levels; the reagent container 107 having a value lower than the first threshold value is "prepare", the reagent container 107 having a lower value than the second threshold value lower than the first threshold value is "caution", and the reagent container 107 having the remaining amount 0 is "warning".

Further, when the respective levels of the reagent remaining amounts simultaneously occur, the icon having the highest priority may be displayed in the order of the priority as "prepare"<"caution"<"warning".

When the automated analysis device finishes the measurement of the calibration sample or the accuracy control sample, the calibration sample/accuracy control sample measurement end notification is transmitted to the tablet terminal 114 through the measurement end management unit 223.

When the tablet terminal 114 receives the measurement end notification, the terminal information management unit 210 flickers the calibration sample/accuracy control sample measurement end notification icon 607 within the device button 603 of the corresponding automated analysis device.

In the example of FIG. 8, although the measurement end notification icon 607 of the calibration/accuracy control sample is the integrated icon of the calibration sample and the accuracy control sample, the above icon may be divided and displayed separately.

The measurement result notification of the urgent patient sample is transmitted to the tablet terminal 114 through the measurement end management unit 223 when the automated analysis device finishes the measurement of the urgent patient sample. As for the urgent patient sample, for example, the sample container 102 of the urgent patient is mounted in the sample rack 103 with a barcode for urgent patient sample attached, and the automated analysis device reads the barcode and recognizes the urgent patient sample.

When the tablet terminal 114 receives the patient sample notification, the terminal information management unit 210 flickers the patient sample notification icon 608 within the device button 603 of the automated analysis device.

The above-mentioned respective icons may be designed to notify with sound together with the flickering, using a speaker provided in the tablet terminal. Alternatively, instead of the flickering display, lighting display, another icon display, or shape-changed display may be adopted.

<Example of Balloon Screen>

Figure 9:
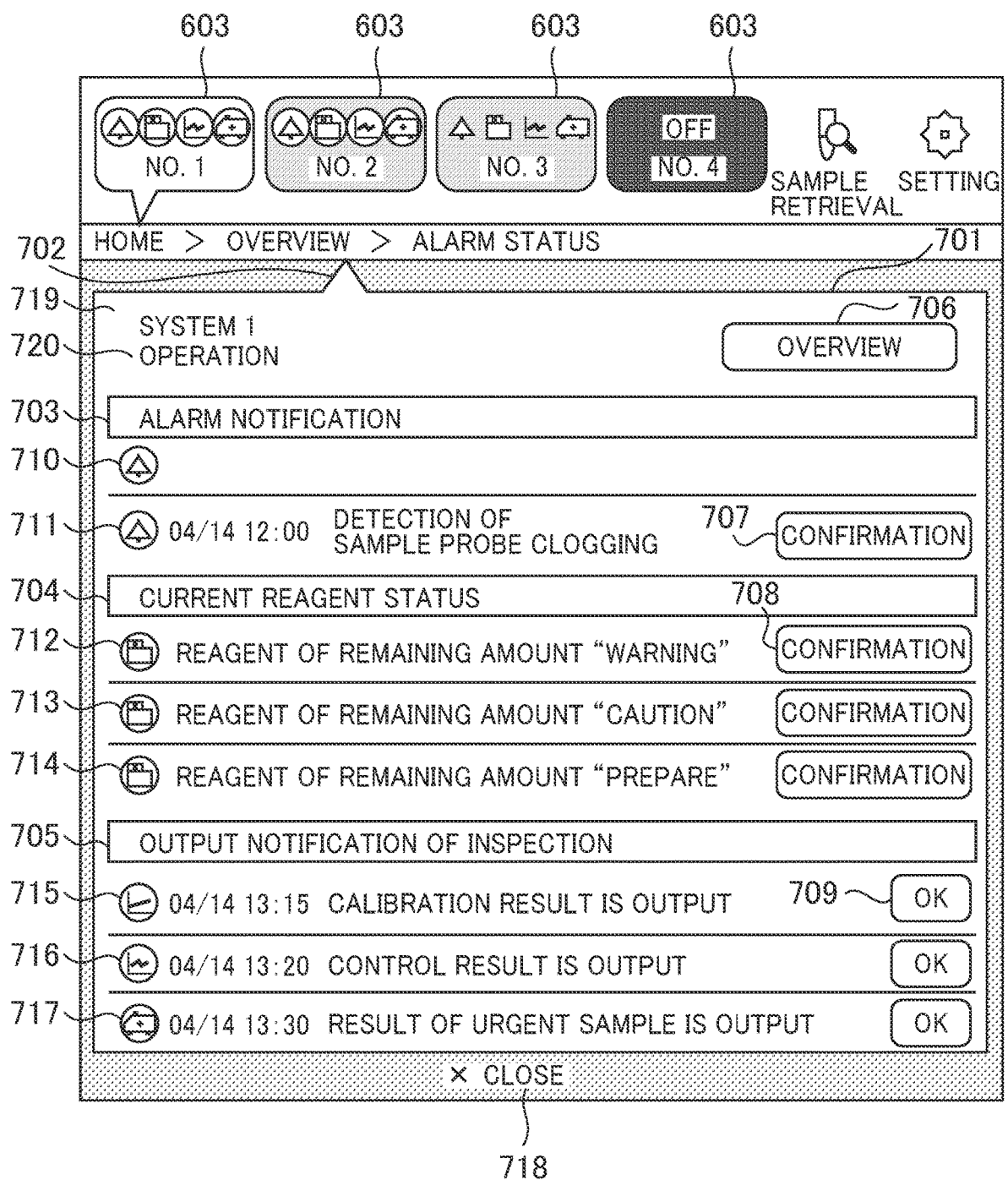
FIG. 9 is an explanatory view showing one example of a balloon screen for displaying the notification contents in various icons on the device button of FIG. 8.

FIG. 9 is an explanatory view showing one example of a balloon screen for showing the notification contents displayed by various icons in the device button of FIG. 8.

By pushing the device button 603, the balloon screen 701 is displayed in front of the base screen, overlapping with the base screen displayed in the second area 602. This balloon screen 701 shows a corresponding device mark which enables an operator to recognize which automated analysis device the displayed balloon screen 701 corresponds to.

The example of FIG. 9 shows a triangle 702 on the top of the balloon screen 701 as the corresponding device mark. Since the apex of the triangle 702 shows the device button 603 corresponding to the automated analysis device having the device name "No. 2", the display of the balloon screen 701 means that the notification about the automated analysis device "No. 2" is shown in this case.

The balloon screen 701 indicates the device name 719 and the current device status 720 of the automated analysis device shown in the device name 719, showing the detailed information corresponding to the flickering icon within the device button 603.

As mentioned above, even if the hierarchy gets deeper according to the device button 603, it is possible to easily confirm the device information of any automated analysis device according to the balloon screen 701.

The balloon screen 701 includes an alarm notification area 703, a reagent shortage notification area 704, and a sample measurement end notification area 705.

The alarm notification area 703 shows the latest alarm information occurring in every alarm level of "caution" and "warning" indicated by the icon and the time of occurrence. Further, a confirmation button 707 is arranged in every level of "caution" and "warning". When pushing the confirmation button 707, the balloon screen 701 is closed and the base screen shifts to the alarm status screen of the corresponding automated analysis device. In the alarm status screen, the detailed information such as how to cope with the alarm can be confirmed.

The display of the notification contents of each level in the alarm notification area 703 and the flickering display of the icon 605 within the device button 603 disappear when shifting to the alarm status screen of the base screen.

The reagent shortage notification area 704 shows the reagent shortage information occurring in every level of "prepare", "caution", and "warning". Further, a confirmation button 708 is arranged in every level of "prepare", "caution", and "warning".

When pushing the confirmation button 708, the balloon screen 701 is closed and the base screen shifts to the reagent status screen of the corresponding analysis device. The reagent shortage notification area 704 is to confirm the detailed information about which reagent is short on the reagent status screen.

The display of the notification contents of each level of the reagent shortage notification area 704 and the flickering display of the sample-remaining amount notification icon 606 disappear by replacing and refilling the target reagent of the reagent disks 108a to 108c of FIG. 1 so that the reagent remaining amount level may get a predetermined threshold value and more.

The sample measurement end notification area 705 shows the measurement end time and the notification contents of the calibration sample, the accuracy control sample, and the urgent patient sample. An OK button 709 is arranged in every sample notification and by pushing the OK button 709, the notification information is deleted.

The displayed balloon screen 701 is closed by pushing a "close" button 718 or the device button 603. When the balloon screen 701 is closed, the base screen prior to the display of the balloon screen 701 appears.

According to this, for example, while working referring to the base screen of one automated analysis device, in the event of the alarm in another automated analysis device, an operator can confirm the alarm contents of the above automated analysis device in the balloon screen 701.

According to this confirmation, in the case of the alarm requiring any countermeasure, pushing the confirmation button and referring to the alarm status screen of the corresponding automated analysis device, an operator can smoothly confirm the details of the alarm and how to cope with the alarm.

In the alarm not requiring any countermeasure, by closing the balloon screen 701, an operator can return to the base screen of the automated analysis device under operation immediately; therefore, without any troublesome work of screen shift, the operator can continue the incomplete operation at ease.

<Another Example of Balloon Screen>

Figure 10:
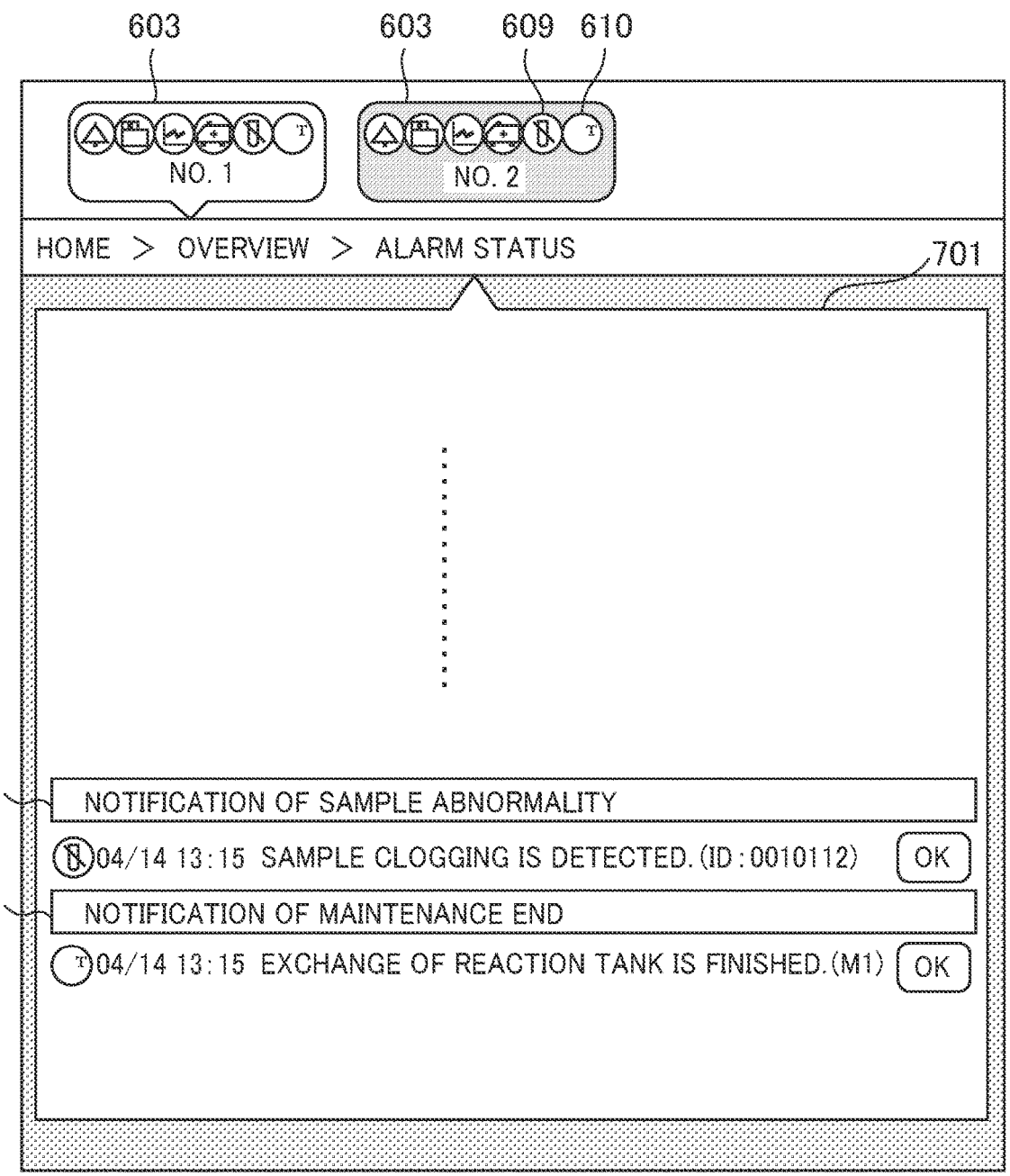
FIG. 10 is an explanatory view showing another example of the balloon screen of FIG. 9.

FIG. 10 is an explanatory view showing another example of the balloon screen of FIG. 9.

FIG. 10 shows an example of adding icons 609 and 610 to the device button 603 as the notification information and adding a sample abnormality notification 705 and a maintenance end notification 706 to the balloon screen 701.

At the time of detecting the clogging of a dispersing nozzle when the sample dispensing mechanism 121a disperses a sample in the automated analysis device 101 or a shortage of the amount of a sample, the automated analysis device 200 reports the sample abnormality notification to the operation unit PC 111 and through the information management PC 112, the tablet terminal 114 is notified of the sample abnormality notification 705.

When receiving the notification in the tablet terminal 114, the terminal information management unit 210 flickers the icon 609 as the fifth icon for notifying the sample abnormality of the device button 603. Further, the terminal information management unit 210 shows the sample abnormality notification 705 including the time of occurrence, the abnormality contents such as sample clogging and sample shortage, and the sample ID number for specifying a sample as the sample abnormality notification contents, in the corresponding balloon screen 701.

According to this, an operator can cope with the abnormal sample, watching the information of the screen shown in FIG. 10 and prepare for remeasurement quickly.

When the operation unit PC 112 receives the end notification of the maintenance performed by the operation unit PC 112 of the automated analysis device on the automated analysis device 200, the tablet terminal 114 is notified of the maintenance end notification 706 through the information management PC 112.

When receiving the notification in the tablet terminal 114, the terminal information management unit 210 flickers the icon 610 of the device button. This icon 618 is an icon for notifying the end of the maintenance of the automated analysis device.

Then, the terminal information management unit 210 shows the maintenance end notification 706 including the end time, the maintenance items, and the target portion of the maintenance as the notification contents, in the balloon screen 701.

According to this, an operator can know the end of the maintenance of the automated analysis device, just by seeing the notification contents of the maintenance end notification 706, so that the operator can start the routine and prepare for the next maintenance quickly.

<Display Shift of Device Button>

Figure 11:
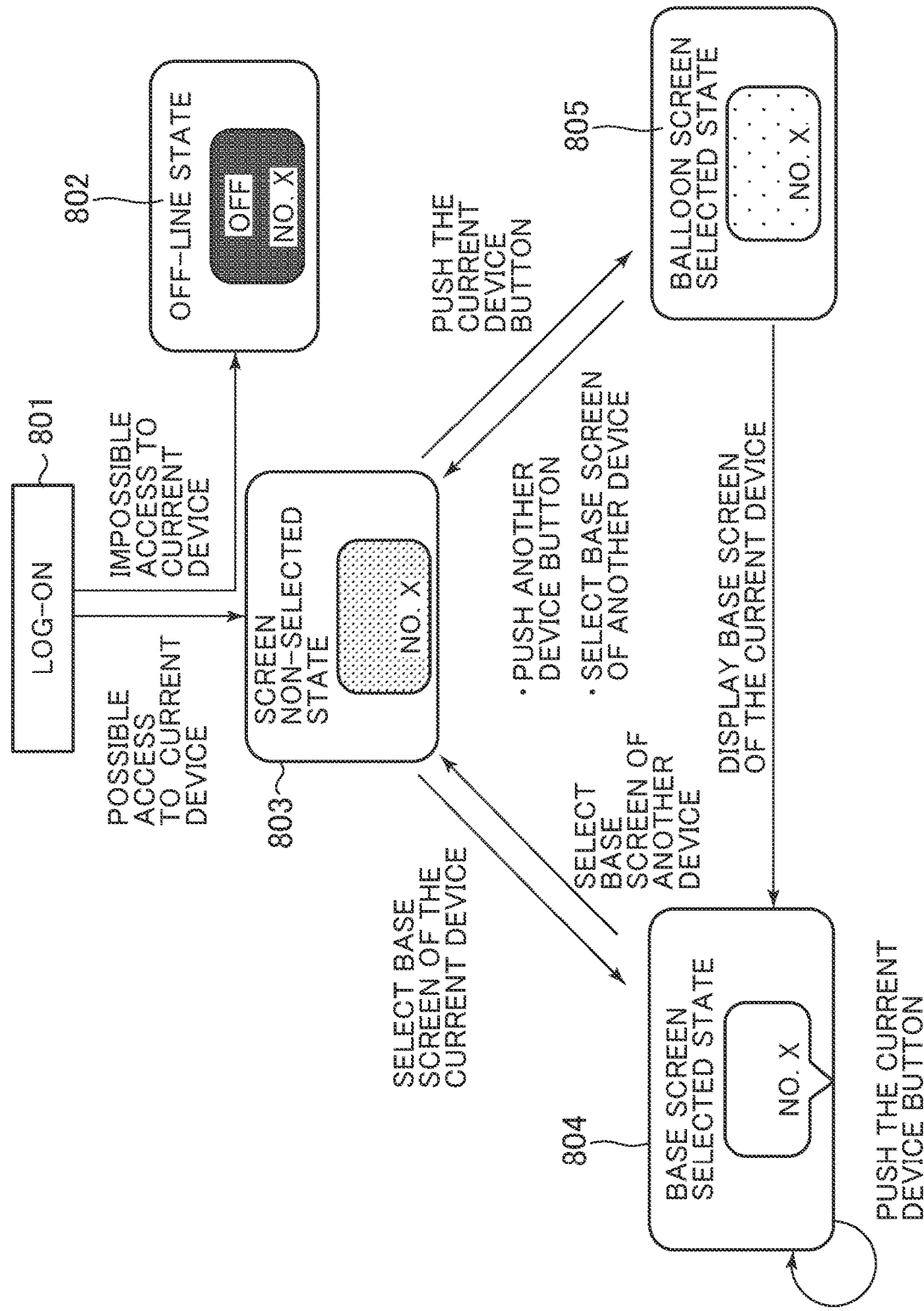
FIG. 11 is an explanatory view showing an example of the display shifting state on the device button shown in FIG. 8.

FIG. 11 is an explanatory view showing an example of the shifting display state of the device button shown in FIG. 8.

When displaying each status screen of the plural automated analysis devices, it is important to clearly display to which analysis device the plural display screens such as the base screen and the balloon screen correspond.

Therefore, the display of the device button 603 has four display states: a base screen selected state 804, a balloon screen selected state 805, a screen non-selected state 803, and an off-line state 804, and the device button display is switched for clearly understanding each state.

The base screen selected state 804 is a first display state and the balloon screen selected state 805 is a second display state. The screen non-selected state 803 is a third display state.

The off-line state 802 is the state in which the device is determined inaccessible in the processing of Step S104 in the log-on processing of FIG. 5. The automated analysis device in this state cannot be referred to the information such as the device status and therefore, the device button 603 is in an unable to be pushed.

The screen non-selected state 803 is the state in which the automated analysis device is accessible in the processing of Step S103 in the log-on processing of FIG. 5 and neither the base screen nor the balloon screen is selected.

When the base screen is selected, the display shifts to the base screen selected state 804. When pushing the device button 603, it shifts to the balloon screen selected state 805. The base screen selected state 804 is the state in which the automated analysis device is accessible in the processing of Step S103 in FIG. 5 and the base screen is selected.

When the base screen of another automated analysis device is selected, it becomes the screen non-selected state 803. In FIG. 11, even when pushing the same device button in the base screen selected state 804, the base screen selected state 804 remains as it is; however, the selected state of both the base screen and the balloon screen may be managed as the separate states.

The balloon screen selected state 805 is the state in which the automated analysis device is accessible in the processing of Step S103 in FIG. 5, the base screen is not selected and the balloon screen is displayed. When the device button 603 is pushed or the base screen is selected for another automated analysis device, the balloon screen 701 is closed and it becomes the screen non-selected state 803. When the base screen of some automated analysis device is selected, the balloon screen is closed and it becomes the base screen selected state 804.

Here, the device button 603 is displayed in a distinguishable way into the base screen selected state, the balloon screen selected state, the screen non-selected state, and the off-line state, which makes it easy to know to which automated analysis device the display screen corresponds.

For example, FIG. 9 shows the device buttons 603 in the base screen selected state, the balloon screen selected state, the screen non-selected state, and the off-line state, from left to right, and the device buttons 603 are displayed in various background colors or button shapes, and button frames depending on each state.

<Relation between Hierarchical Screen and Device Button>

Figure 12:
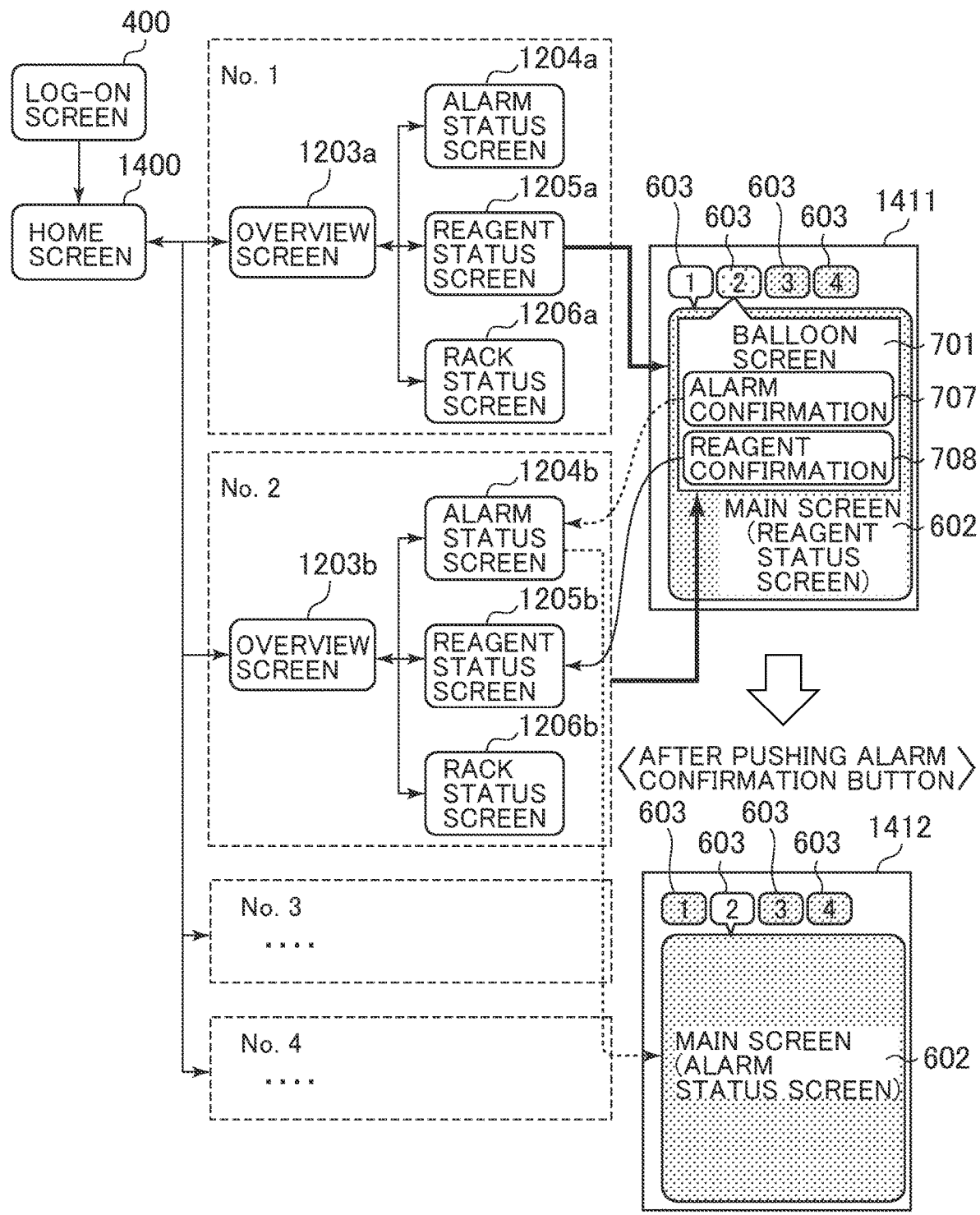
FIG. 12 is an explanatory view showing one example of a relation between the hierarchical screen and the device button displayed in the tablet terminal included in the automated analysis system of FIG. 3.

FIG. 12 is an explanatory view showing one example of a relation between the hierarchical screen and the device button shown in the tablet terminal included in the automated analysis system of FIG. 3.

A screen 1411 shown in FIG. 12 schematically illustrates the display state of the balloon screen displayed in the tablet terminal 114 for easy understanding.

The main screen 602 is in the state where the reagent status screen 1205a in the automated analysis device having the device name "No. 1" is displayed and the device button 603 corresponding to the automated analysis device "No. 1" is displayed in such a distinctive button shape or background that an operator can know the "No. 1" device is currently selected in the main screen 602.

The balloon screen 701 is displayed in front of the main screen 602. The information shown in the balloon screen 701 is displayed with the device button 603 in such a shape or background color that an operator can see this is the information of the "No. 2".

In the balloon screen 701 showing the information of the "No. 2", when pushing the alarm confirmation button 707 or the reagent confirmation button 708, the main screen 602 shifts to the alarm status screen 1204b or the reagent status screen 1205b of the "No. 2".

A screen 1412 below the screen 1411 shows an example of the screen display after pushing the alarm confirmation button of the balloon screen 701 corresponding to the automated analysis device "No. 2".

In this case, the main screen 602 shows the alarm status screen 1204b in the automated analysis device "No. 2" and the corresponding device button 603 of the No. 2 is displayed in such a distinctive button shape or background color that an operator can see No. 2 is currently selected in the main screen.

<Operation Example of Screen>

Figure 13:
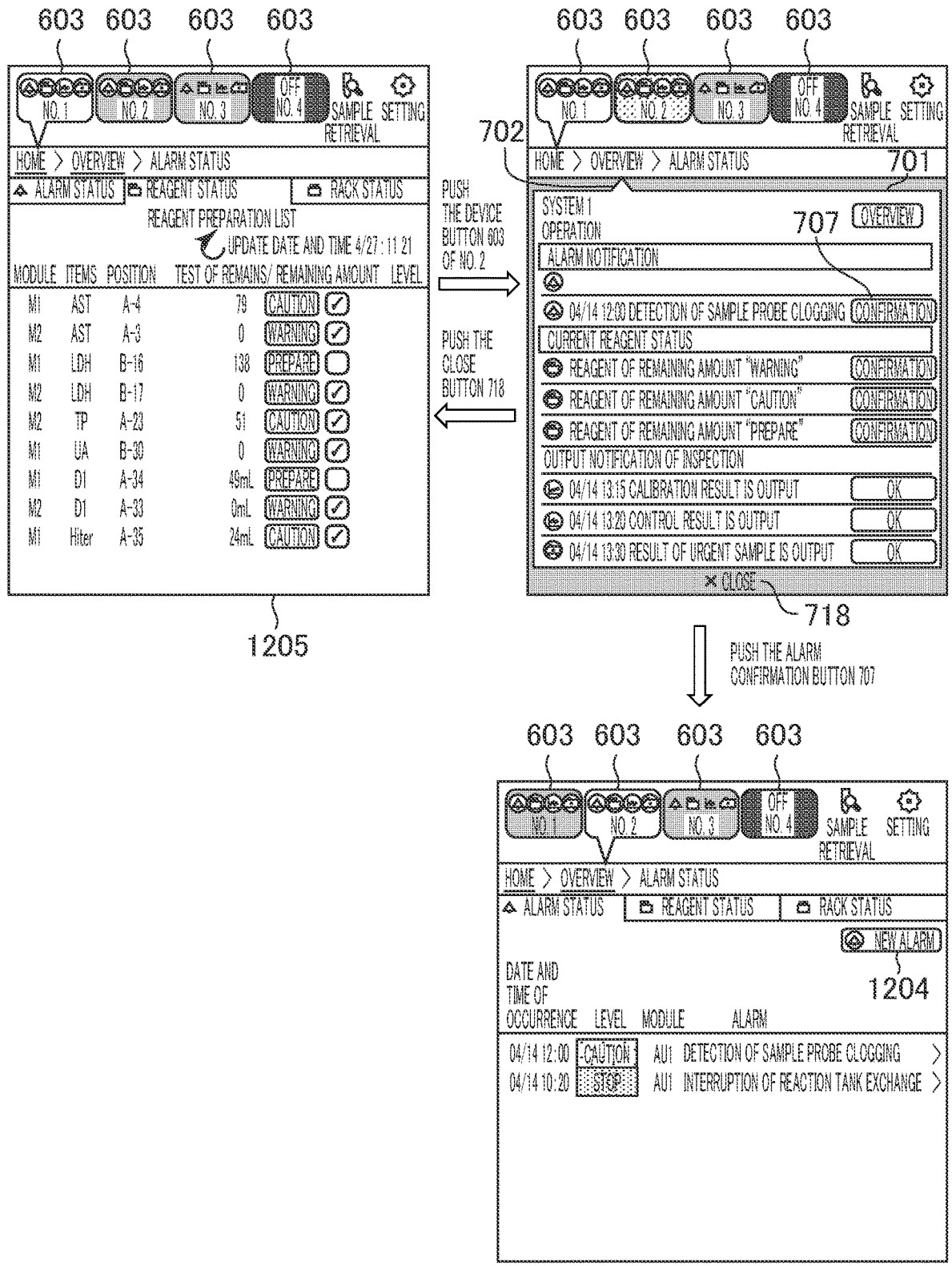
FIG. 13 is an explanatory view showing a concrete example of the balloon screen operation shown in FIG. 9.

FIG. 13 is an explanatory view showing a concrete example of the balloon screen operation shown in FIG. 9.

In the screen shown on the left side of FIG. 13, assume that the reagent status screen 1101 is displayed in the automated analysis device having the device name "No. 1" which is currently displayed for an operator to prepare the reagent.

The device button 603 corresponding to the automated analysis device "No. 1" displayed at the leftmost side is displayed in such a button shape and background color as indicating that the base screen under displaying is the screen of "No. 1".

When an alarm occurs from the automated analysis device "No. 2" in this state, the alarm notification icon 605 displayed in the device button 603 corresponding to the automated analysis device "No. 2" is flickered together with the alarm sound.

When an operator pushes the device button 603 at the second position from the left corresponding to the automated analysis device "No. 2" to confirm the alarm contents, the balloon screen 701 corresponding to the automated analysis device "No. 2" is displayed in a way of overlapping with the reagent status screen 1205 corresponding to the automated analysis device "No. 1" as the current base screen, in front of the same.

The device button 603 corresponding to the automated analysis device "No. 2" is changed into such a shape or background color as indicating that the balloon screen 701 is displayed. The device button 603 corresponding to the automated analysis device "No. 1" does not change as the base screen is of the "No. 1".

An operator confirms the alarm contents in the balloon screen 701. In the case of the alarm contents not requiring any countermeasure, pushing the close button 718 and closing the balloon screen 701, the operator returns to the reagent status screen of "No. 1" as the base screen and continues the preparing work of the reagent.

In the case of the alarm contents requiring any countermeasure, pushing the confirmation button 707, the base screen is shifted to the alarm status screen 1204 corresponding to the automated analysis device "No. 2".

Here, the device button 603 corresponding to the automated analysis device "No. 2" is changed into the shape or background color indicating the base screen and the device button 603 corresponding to the automated analysis device "No. 1" is changed into the shape or background color indicating the non-selected state.

<Arrangement Change of Device Button>

Figure 14:
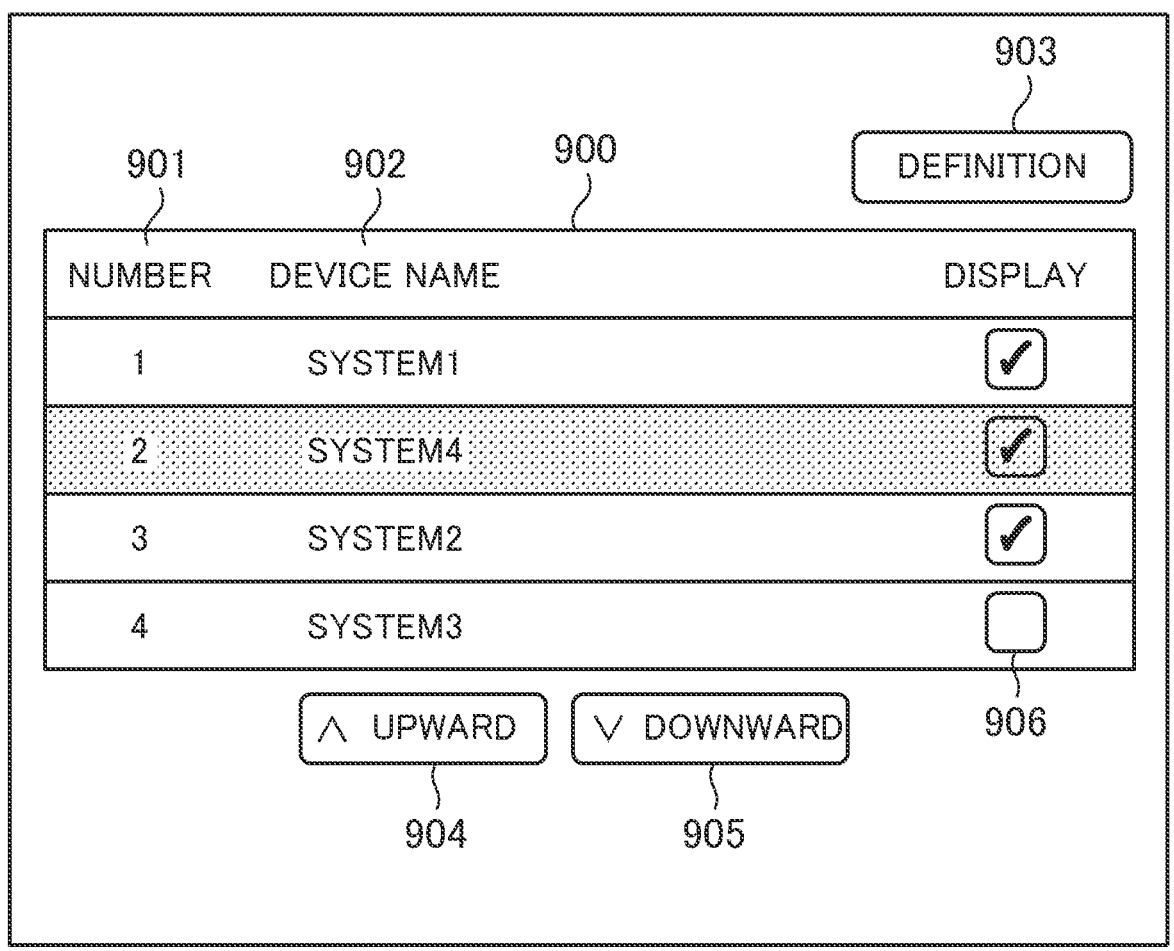
FIG. 14 is an explanatory view showing one example of arrangement change of the device buttons shown in FIG. 8.

FIG. 14 is an explanatory view showing one example of the arrangement change of the device button shown in FIG. 8.

FIG. 14 describes a customization example of changing the display arrangement of the device buttons 603 shown in FIG. 8, for example, according to an operator.

The information input in FIG. 14 is the device button setting information.

When changing the arrangement of the device buttons 603, a display order list 900 shown in FIG. 14 is displayed in the terminal display unit 208 of the tablet terminal 114. This display processing is executed by the terminal information management unit 210.

The display order list 900 shows a display order number 901, a device name 902, and a device button 906. The display order number 901 indicates the display order of the coupled automated analysis devices. The device name 902 indicates a name of each automated analysis device according to the display order number 901. The device button 906 is a button for setting the device button 603 of the automated analysis device in display or non-display.

A confirmation button 903 for confirming the change is displayed on the right upward side of the display order list 900. An upward button 904 is displayed on the left side and a downward button 905 is displayed on the right of the above upward button 904, in the bottom of the display order list 900.

When an operator selects the device name of the automated analysis device he or she wants to change in the display order list 900, the background color of the selected line is changed into the selected state. In this state, the operator pushes the upward button 904 once to replace the display order of the selected line with one upper line and the order of the selected device is moved up by one.

Further, when pushing the downward button 905 once, the display order is replaced with the display of one downward line and the order is moved down by one. According to this, the operator can replace the display order of the automated analysis devices on the screen according to his or her taste.

FIG. 14 shows an example of the display order as the device button 603 corresponding to the automated analysis device having the device name "System 1", the device button 603 corresponding to the automated analysis device having the device name "System 4", and then the device button 603 corresponding to the automated analysis device having the device name "System 2" in this sequence.

The display button 906 can switch the device button 603 between display and non-display. When the display button 906 is pushed once, a check mark disappears (non-display setting) and when it is pushed again, the check mark appears (display setting).

In the case of no check mark, the device button 603 is hidden, and in the case of the check mark, the device button 603 is displayed. FIG. 3 shows the example in which the device button 603 corresponding to the automated analysis device having the device name "System 3" is set in the non-display.

When the display order and the display/non-display setting are determined in the device buttons 603, the confirmation button 903 is pushed, hence to store the display order information and the display setting information of the device buttons 603 in the information management storage unit 233 of the information management PC 112.

In displaying the main screen again, the terminal information management unit 210 of the tablet terminal 114 displays the device buttons 603 in the first display area 601 shown in FIG. 8 and the like, according to the information of the device display order and the display setting stored in the information management storage unit 233.

Further, at the display of the home screen 1400 of FIG. 6, the display of the device select buttons 1403a to 1403d is changed in the order, according to the information of the device display order and the display setting.

When the number of the coupled automated analysis devices gets larger, it becomes hard to correspond the respective automated analysis devices on the screen display with the actually set analysis devices; however, by setting the display order and the display/non-display setting of the device buttons 603 using the display order list 900 of FIG. 14, it is possible to monitor the status of the automated analysis devices in the order easily controllable by an operator.

Further, in the display setting, because of a failure or maintenance in a part of the coupled automated analysis devices, the automated analysis device which is not used in a routine measurement can be hidden; further, when the automated analysis devices are classified by the operators in charge, the automated analysis devices not in charge can be easily set in the non-display. According to this, an operator can manage the desired automated analysis devices on the screen and customize the screen easily.

According to this, it is possible to confirm the status of the automated analysis devices for a short time and efficiently. Therefore, the inspection efficiency can be improved.

As mentioned above, the invention made by the inventor et al. has been described specifically based on the embodiment; however, the invention is not restricted to the above embodiment but needless to say, various modifications are possible without departing from its spirit.

The invention is not restricted to the above mentioned embodiment but it includes various modified examples. For example, the above-mentioned embodiment described in detail is to describe the invention clearly and the invention is not restricted to the embodiment including all the components described above.

Further, a part of the components of one embodiment can be replaced with some component of another embodiment or some component of another embodiment can be added to the component of one embodiment. Further, apart of the components of the embodiment can be added to, deleted from, or replaced with another component.

REFERENCE SIGNS LIST

100: automated analysis system
101: automated analysis device
102: sample container
103: sample rack
104: sample input unit
105: carrying line
106a: analysis unit
106b: analysis unit
106c: analysis unit
107: reagent container
108a: reagent disk
108b: reagent disk
108c: reagent disk
109 sample accommodating unit
110 communication equipment
111 operation unit PC
112 information management PC
113 wireless equipment
114 tablet terminal
120a: reaction disk
120b: reaction disk
120c: reaction disk
121a: sample dispensing mechanism
121b: sample dispensing mechanism
121c: sample dispensing mechanism
122: reagent dispersing mechanism
122b: reagent dispersing mechanism
122c: reagent dispersing mechanism
123a: photometric mechanism
123b: photometric mechanism
123c: photometric mechanism
130: communication equipment
201: input unit
202: display unit
204: device information management unit
205: communication unit for information management PC
206: storage unit
207: communication unit for analysis unit
208: terminal display unit
209: terminal communication unit
210: terminal information management unit
211: terminal input unit
221: alarm management unit
222: reagent management unit
223: measurement end management unit
231: information management communication unit
232: information management unit
233: information management storage unit

The invention claimed is:

1. An automated analysis system comprising:
a plurality of automated analysis devices for measuring respective samples;
a computer coupled to the plurality of automated analysis devices;
a wireless router coupled to the computer;
a portable terminal device that wirelessly communicates with the wireless router, wherein the terminal device includes a display and is configured to:

wirelessly obtain device information indicating respective device statuses of the automated analysis devices and create a status screen indicating the device statuses of the plurality of automated analysis devices based on the obtained device information, and display, on the display, the status screen, and wherein the status screen simultaneously displays:

a first display area displaying a plurality of device buttons which respectively correspond to each of the automated analysis devices coupled to the terminal device, and a second display area displaying the device status of the automated analysis device corresponding to a selected device button of the plurality of device buttons in the first display area, wherein each device button displayed in the first display area includes a plurality of alert icons, wherein the terminal device receives alert notification information from a respective automated analysis device, wherein the terminal device changes respective displays of the alert icons based on the obtained device information of the respective automated analysis device, wherein the alert icon of the device button includes:

a first icon indicating measurement of calibration or accuracy control sample of the respective automated analysis device has ended based on the obtained device information, and a second icon indicating measurement of an urgent patient sample has ended based on the obtained device information, wherein, terminal device displays a base screen indicating reagent status information of a first automated analysis device among the plurality of automated analysis devices and upon receiving a selection, by the terminal device, of a first device button corresponding to a second automated analysis device among the plurality of automated analysis devices for displaying a status screen showing an alarm status and a reagent status of the second automated analysis device in the second display area during display of the base screen, the terminal device displays the status screen showing the alarm status and the reagent status of the second automated analysis device corresponding to the selected first device button in front of and overlapping the base screen indicating reagent status information of the first automated analysis device, and upon receiving a selection, by the terminal, to close the status screen, switch the display of the second area to display the base screen from behind the status screen.

2. The automated analysis system according to claim 1, wherein upon receiving a selection, by the terminal device, of the device button having the alert icon which has been changed in display the terminal device controls the display to show a notification screen indicating the contents of the alert in the second display area, based on the device information of the respective automated analysis device which has notified the alert.

3. The automated analysis system according to claim 1, wherein the terminal device switches a display state of each of the device buttons according to whether the second display state is in a first display state, a second display state, or a third display state, wherein the first display state indicates that the base screen of the same automated analysis device as that corresponding to the device button switching the display is shown in the second display area, the second display state indicates that the status screen of the same automated analysis device as that corresponding to the device button switching the display, is shown in the second display area, and the third display state indicates that none of the base screen and the status screen of the same automated analysis device as that corresponding to the device button switching the display, is shown in the second display area.

4. The automated analysis system according to claim 1, wherein the terminal device includes an input unit for receiving entered information, and wherein the terminal device displays or deletes a respective device button, based on device button setting information entered via the input unit.

5. The automated analysis system according to claim 1, wherein the alert icon of the device button includes a third icon for notifying that an abnormality occurred in a sample during analysis, and wherein when the automated analysis device notifies the occurrence of the above abnormality, the terminal device controls the display to change a display of the third icon and display a notification screen showing the contents of the abnormality of the sample in its second display area.

6. The automated analysis system according to claim 1, wherein when a predetermined button is selected during displaying the status screen, the terminal device controls the display to show the base screen of the corresponding automated analysis device.

7. The automated analysis system according to claim 1, wherein the terminal device includes an input unit for receiving entered information, wherein the device button displayed in the first display area of the display has a plurality of alert icons corresponding to the contents of the alert, and wherein when the automated analysis device notifies an alert, the terminal device controls the display to change the display of the device button corresponding to the automated analysis device and change the display of the alert icon corresponding to the alert of the automated analysis device, based on the device information of the automated analysis device, changes a display order of the device buttons to show the device buttons in the display, based on device button setting information entered from the input unit, and displays or deletes the device button, based on the device button setting information entered from the input unit.

8. The automated analysis system according to claim 6, wherein when the device button having the alert icon which has been changed in the display is selected, the device terminal controls the display to show a notification screen showing the contents of the alert in its second display area, based on the device information of the automated analysis device which has notified the alert.

* * * * *